March 31, 1959  H. B. BUCKINGHAM ET AL  2,880,377
SAFETY SYSTEM FOR GROUND CONDUCTOR OF TRAILING CABLE
Filed Aug. 31, 1956
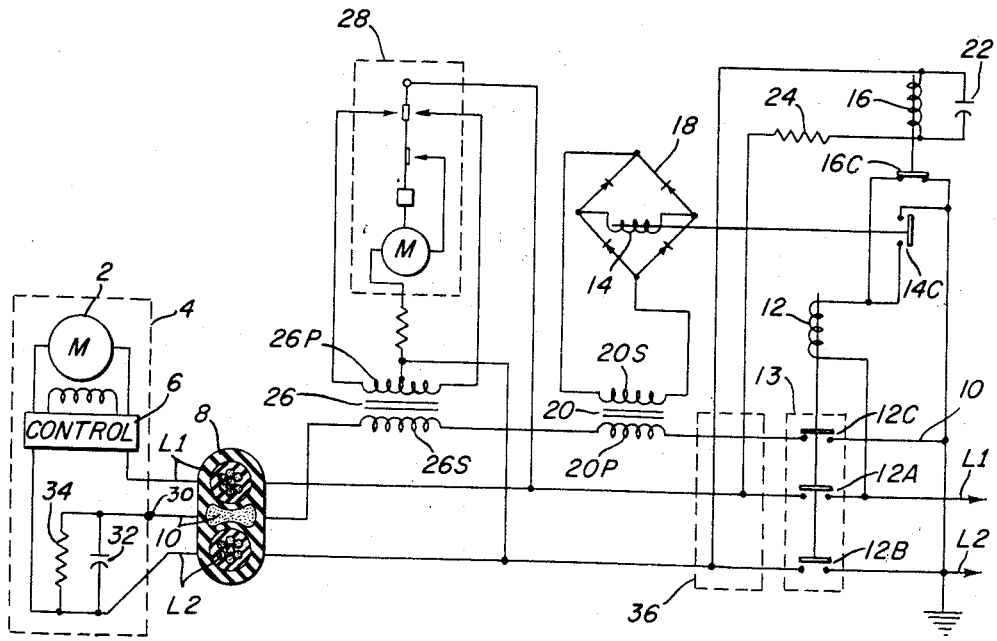
INVENTORS:
HOWARD B. BUCKINGHAM and
JAMES B. CAMP,
By: Donald G. Dalton
their Attorney.

United States Patent Office 2,880,377
Patented Mar. 31, 1959

2,880,377

SAFETY SYSTEM FOR GROUND CONDUCTOR OF TRAILING CABLE

Howard B. Buckingham, Birmingham, and James B. Camp, Fairfield, Ala., assignors to United States Steel Corporation, a corporation of New Jersey Application August 31, 1956, Serial No. 607,388

3 Claims. (Cl. 317—18)

This invention relates to a safety system for the ground conductor of a trailing cable and more particularly to such systems wherein the cables supply power to portable electrical equipment. The trailing cable includes positive and negative power lines and a safety ground wire. When such equipment is used in mines, there is grave danger of explosions due to ignition arcs and also danger of electrical shock in the grounding conductor is not operating. After the cable has been flexed a great number of times, the ground conductor begins to break its strands and current flows only by coherence between the parts of the ground conductor. Eventually the ground conductor separates entirely and the equipment is therefore not grounded. In addition to normal wear, the grounding conductor may be damaged in other ways. The importance of the safety ground is such that many operations require daily testing for frame ground conductor continuity. Even with such tests, the frame ground conductor may be open circuited without the operator being aware thereof. In addition to breakage of the grounding conductor, there is danger of the ground conductor attempting to carry direct current in addition to its normal alternating current. This condition can occur if a short circuit or low resistant leakage path develops between the safety ground conductor and the power conductors in either the cable or at the machine.

It is therefore an object of our invention to provide an apparatus for removing power from portable equipment when an open circuit occurs in the trailing cable safety ground conductor or when the safety ground conductor attempts to carry direct current.

This and other objects will be more apparent after referring to the specification and attached drawings in which:

The figure is a schematic view of our improved system including a cross-section of the conductor.

Referring more particularly to the drawings, reference numeral 2 indicates the motor of a portable machine 4 having usual controls 6. D.C. power is supplied to motor 2 from lines L1, L2 contained in a cable 8 which also contains a safety ground wire 10. An under voltage trip coil 12 operates to open contacts 12A, 12B and 12C of a circuit breaker 13. The circuit breaker is the manually closed type and can be closed only when coil 12 is energized. Coil 12 is connected to power source L1, L2 on the line side of the contacts 12A and 12B remote from the motor 2. Relay contacts 14C and 16C are connected in parallel in the circuit leading to coil 12. Contact 14C is normally open and is connected to be operated by relay coil 14. Contact 16C is normally closed and is connected to be operated by relay coil 16. Relay coil 14 is arranged in a rectifier bridge circuit 18. Secondary 20S of a transformer 20 is connected across the terminals of bridge 18. Primary 20P of transformer 20 is connected in series with the safety ground wire 10. Relay coil 16 is connected across power lines L1 and L2. Condenser 22 is connected in parallel with relay coil 16 and a resistor 24 is connected in series with coil 16. A transformer 26 has its secondary 26S connected in series with ground wire 10 and its primary 26P arranged in circuit with a 60-cycle vibrator 28 which is connected across lines L1 and L2. Safety ground wire 10 is connected to the frame 30 and to the negative line L2 through a condenser 32 and also through a parallel circuit including a resistor 34.

The operation of our device is as follows:

Machine cable 8 is connected to the power source in any suitable manner such as by a cable connector 36. When power is applied to lines L1 and L2 the coil 12 will be energized through normally closed contact 16C. This allows the contacts of the circuit breaker to be closed and the 60-cycle vibrator 28 begins to operate, thus inducing alternating current in the secondary 26S. This alternating current flows through ground wire 10, condenser 32, negative power line L2, circuit breaker contacts 12B and 12C and primary 20P. The alternating current in the primary 20P induces an A.C. voltage in the secondary 20S which voltage is rectified and energizes relay coil 14 thus closing contacts 14C. As the circuit breaker is closed power is applied to relay coil 16. After a short time interval, the duration of which is determined by the timing circuit consisting of condenser 22 and resistor 24, the relay coil 16 is energized thus opening contact 16C. The time interval between the closing of contact 14C and the opening of contact 16C is necessary to avoid momentarily deenergizing the coil 12 which would open the contacts of the circuit breaker immediately after closing. If a break in the conductor 10 or negative power wire L2 should occur or the circuit from secondary 26S to primary 20P be interrupted in any manner the induced alternating current will cease to flow and relay coil 14 would be deenergized, thus opening its contact 14C. Opening of contact 14C interrupts the circuit through coil 12, thus opening contacts 12A, 12B and 12C so that power will be removed from cable 8 and machine 4. In a trailing cable of the type described above, a cable fire is almost always preceded by excessive direct current leakage between power conductors L1 and L2. Since the safety ground conductor 10 is physically located between the power conductors direct current will also attempt to flow in the circuit between conductors L2 and 10. A direct current of from 10 to 15 amperes in this circuit will saturate the cores of transformers 20 and 26, thus rendering them incapable of producing sufficient alternating voltage in their secondary windings to maintain relay 14 in the energized position. Thus excessive direct current leakage will deenergize relay 14 opening contacts 14C and interrupting the circuit through coil 12 to open contacts 12A, 12B and 12C so that power will be removed from the cable 8 and the machine 4.

While one embodiment of our invention has been shown and described it will be apparent that other adaptations and modifications may be made without departing from the scope of the following claims.

We claim:

1. In a portable machine having direct current applied thereto through a cable including positive and negative leads and a safety ground wire connected to ground, the combination including means connecting said leads to said machine, means connecting said ground wire to the machine frame, a circuit breaker for controlling flow of current to said machine through said cable, a circuit for normally holding said circuit breaker closed, a first transformer, a second transformer, the primary of said first transformer and the secondary of said second transformer being connected in series with said ground wire, means connecting one of said leads and said ground wire in circuit, means for supplying alternating current to the primary of said second transformer, and a circuit including the secondary of said first transformer for opening said circuit breaker when the current in the secondary of said first transformer decreases below a certain value.

2. In a portable machine having direct current applied thereto through a cable including positive and negative leads and a safety ground wire connected to ground, the combination including means connecting said leads to said machine, means connecting said ground wire to the machine frame, a circuit breaker for controlling flow of current to said machine through said cable, a circuit for normally holding said circuit breaker closed, a first transformer, a second transformer, the primary of said first transformer and the secondary of said second transformer being connected in series with said ground wire, a rectifier bridge circuit, the secondary of said first transformer being connected across two opposed terminals of said bridge circuit, means connecting one of said leads and said ground wire in circuit, a condenser in said last named circuit, means for supplying alternating current to the primary of said second transformer, and means connected across the other two terminals of said bridge circuit for opening said circuit breaker when the current in the secondary of said first transformer decreases below a certain value.

3. In a portable machine having direct current applied thereto through a cable including positive and negative leads and a safety ground wire connected to ground, the combination including means connecting said leads to said machine, means connecting said ground wire to the machine frame, a circuit breaker for controlling flow of current to said machine through said cable, a control circuit for said circuit breaker, said control circuit including a normally open relay contact and a normally closed relay contact connected in parallel, a first transformer, a second transformer, the primary of said first transformer and the secondary of said second transformer being connected in series with said ground wire, a rectifier bridge circuit, the secondary of said first transformer being connected across two opposed terminals of said bridge circuit, a relay coil connected across the other two terminals of said bridge circuit for closing said normally open contacts when energized, a 60-cycle vibrator connected across the positive and negative leads, the primary of said second transformer being connected to the output of said vibrator, a second relay coil connected across said leads between said circuit breaker and machine for opening said normally closed contact when energized, a connection between said negative lead and said ground wire including a condenser, and a second condenser connected in parallel with said second relay coil.

References Cited in the file of this patent
UNITED STATES PATENTS 2,637,843     Kammerdiener            May 5, 1953

FOREIGN PATENTS 614,652     Germany               June 14, 1935